(12) United States Patent
Martino et al.

(10) Patent No.: US 8,488,754 B1
(45) Date of Patent: Jul. 16, 2013

(54) IP-ENABLED INFORMATION DELIVERY

(75) Inventors: Monica Rose Martino, Plano, TX (US); Taylor Cleghorn, Plano, TX (US)

(73) Assignee: Accudata Technologies, Inc., Allen, TX (US)

( * ) Notice: Subject to any disclaimer, the term of this patent is extended or adjusted under 35 U.S.C. 154(b) by 1670 days.

(21) Appl. No.: 11/974,944

(22) Filed: Oct. 17, 2007

(51) Int. Cl.
*H04M 11/00* (2006.01)
(52) U.S. Cl.
USPC .............. 379/93.25; 379/93.03; 379/93.23; 379/142.01; 379/142.04; 379/142.06; 379/142.1; 455/415
(58) Field of Classification Search
USPC ............ 379/93.03, 93.23, 142.01, 142.04, 379/142.06, 142.1, 93.25; 455/415; 370/352
See application file for complete search history.

(56) References Cited

U.S. PATENT DOCUMENTS

| | | | | |
|---|---|---|---|---|
| 6,721,406 | B1 * | 4/2004 | Contractor | 379/142.06 |
| 2002/0018546 | A1 * | 2/2002 | Horne | 379/142.06 |
| 2007/0280445 | A1 * | 12/2007 | Shkedi | 379/93.23 |

* cited by examiner

*Primary Examiner* — Vivian Chin
*Assistant Examiner* — Paul Kim

(57) ABSTRACT

A method, system, and computer readable medium comprising instructions for providing Internet protocol enabled information delivery are provided. Information from a calling party is received at an Internet protocol enabled device. A lookup of information relating to the calling party is performed in a database via an Internet protocol connection. A message is received from the database comprising information relating to the calling party.

17 Claims, 4 Drawing Sheets

IP-ENABLED INFORMATION DELIVERY

FIELD OF THE INVENTION

The present disclosure is generally related to a communications network, and more particularly to a system, method, and computer readable medium comprising instructions for IP-enabled information delivery in a communications network.

BACKGROUND OF THE INVENTION

Automatic Number Identification (ANI) is a system utilized by telephone companies to identify the Directory Number (DN) of a calling subscriber. ANI serves a function similar to Caller ID, but may utilize different underlying technology. In addition, although Caller ID can be blocked by prefixing a call with *67, for example, ANI is (usually) impossible to block. ANI was originally developed for telephone company billing purposes and is now offered to commercial customers who may benefit from knowing who is calling them. In addition, ANI is one of the core technologies behind the 911 emergency service.

In commercial applications, a user may have an integrated or extraneous display affixed to a telephone. Such a display presents the ANI or telephone number of the calling party. In addition, the display may present the caller's name or calling name, also known as CNAM. However, as the popularity of mobile devices increases, demand for wireless delivery of such calling information also increases. As such, a need exists for providing wireless calling information, including wireless calling name, by wireless device, such as a wireless IP-enabled phone.

SUMMARY OF THE INVENTION

The present disclosure describes a system, method, and computer readable medium comprising instructions for IP-enabled information delivery. Information from a calling party is received at an Internet protocol enabled device. Software for identifying the calling party is retrieved. A lookup of information relating to the calling party is performed in a database via an Internet protocol connection. A message is received from the database comprising information relating to the calling party. Downloading of the software is determined based on a type of the device.

In one embodiment, an identifier of the calling party is received. The identifier of the calling party includes at least one of a calling party and a called party. A query for information relating to the calling party is sent via an Internet protocol connection to the database based on the identifier. A determination is made if the identifier is located in the database. Information relating to the calling party is returned from the database.

The present disclosure also provides a system for IP enabled information delivery. The system comprises at least one Internet protocol enabled device for receiving information from a calling party, at least one calling name database for storing information relating to the calling party, the at least one database is communicably coupled to the at least one wireless Internet protocol enabled device, and at least one Web database for storing a software for identifying the calling party, the at least one Web database communicably coupled to the at least one wireless Internet protocol enabled device via the Internet. The at least one Internet protocol enabled device is operable to receive information from the calling party, perform a lookup of information relating to the calling party in a database via an Internet protocol connection, and receive a message from the at least one database.

DETAILED DESCRIPTION OF THE INVENTION

The present invention provides IP-enabled information delivery to called parties. In the context of the present disclosure, a calling party is a party initiating or sending a call. A called party is a party receiving the call. Such a process is initiated when a calling party contacts a called party wherein the calling party and the called party each use at least one electronic device and the called party is able to receive ANI or Caller ID service and is able to display related information to such service. The at least one electronic device is at least one of a computer, a server, a wireless phone, an Internet Protocol (IP) enabled phone, a wireless IP-enabled phone, or a device that can receive and/or transmit information. The computer readable medium (or software) of the present invention is stored on and/or runs on at least one of the above mentioned electronic devices.

Figure 1:
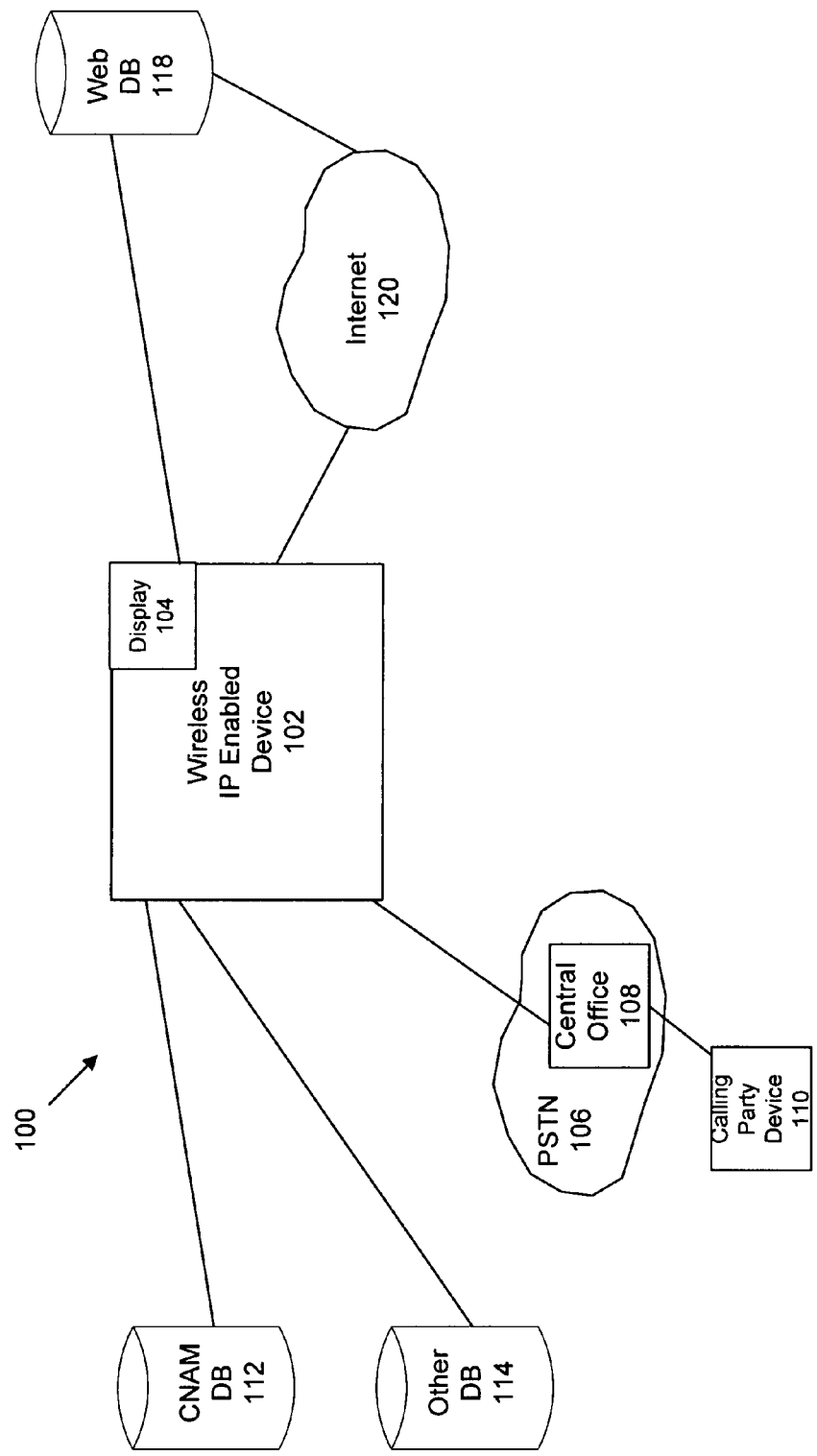
FIG. 1 depicts a system for wireless IP-enabled information delivery in accordance with an embodiment of the present disclosure.

FIG. 1 depicts a system 100 for wireless IP-enabled information delivery in accordance with one embodiment of the present disclosure. System 100 includes a wireless IP-enabled device 102, such as a wireless IP-enabled phone. Wireless IP-enabled device 102 may include a display 104 for displaying calling information to a user. In this embodiment, the display 104 is integrated within the wireless IP-enabled device 102. However, the display 104 may be implemented as a standalone device that is communicably coupled with the device 102 without departing the spirit and scope of the present disclosure.

In addition, wireless IP-enabled device 102 may receive information from a plurality of sources including public switched telephone network (PSTN) 106 which includes a central office 108 communicably coupled to a calling party device 110. Other sources include a wireless network or data network (not shown) supporting other devices such as a computer or IP enabled phones.

When a calling party initiates a call using calling party device 110, wireless IP-enabled device 102 receives an ANI or other identifier of the calling party, such as an IP address or other data identifying the calling party or the calling party device, such as a unique ID of the device. The identifier includes at least one of a calling party and a called party. In turn, the wireless IP enabled device 102 sends a query to a CNAM database 112 or other database 114 via an Internet protocol connection to perform a lookup of the called number in the database. The CNAM database 112 or other database 114 determines if the subscriber of the called number is a paying subscriber. To determine if the subscriber is a paying subscriber, the CNAM database 112 or other database 114 may send information of the called number, including, the called party name, a credit card number, or a zipcode, to another database for verification. If the verification is acceptable, the CNAM database 112 or other database 114 then returns a response to the wireless IP-enabled device 102.

If the subscriber of the called number is a paying subscriber, wireless IP-enabled device 102 determines if a software download is necessary based on the type of the device. For example, wireless IP-enabled device 102 may determine that a software download is necessary in order to obtain calling information based on the ANI. Alternatively, if the software for obtaining calling information is already stored in the wireless IP-enabled device, 102, no software download may be necessary. If the wireless IP-enabled device 102 determines that a software download is necessary, the wireless IP-enabled device 102 initiates the software download either directly from a Web database 118 or via a network, such as the Internet 120.

After the software is downloaded or stored in the wireless IP-enable device 102, the wireless IP-enabled device 102 recognizes the ANI or other identifier of the calling party from the calling party device 110. The ANI or other identifier of the calling party may comprise a 10 digit number, such as a telephone number. In response to recognizing the ANI or other identifier of the calling party, the wireless IP-enabled device 102 sends the ANI or identifier of the calling party to the CNAM database 112 or other database 114 to perform a lookup of the calling number and such number is provided to the wireless IP enabled device 102.

In response to receiving the ANI or other identifier of the calling party, the present invention further permits the CNAM database 112 or other database 114 to perform a lookup of the calling number for information associated with the calling number via an Internet Protocol connection and in response, would return a message to the wireless IP-enabled device 102. In one example, the message may include an 11 or more digit number that indicates the caller's phone number, as well as the caller's name, city, and/or state. In addition, the message may include additional calling information such as alerts in response to an occurrence of an event, informative and promotional information from a service provider, and situational information from an emergency service provider. Furthermore, the message may include other information relating to the calling party, such as a name, a city, a state, an address, a hyperlink, a photo, a video, and any information that can be sent via an Internet Protocol connection.

An example of alerts in response to an occurrence of an event may involve a called party who has ordered a refill of prescription from a pharmacy. When the prescription is ready for pickup, the pharmacy may initiate a call to the wireless IP-enabled device 102. The CNAM database 112 or other database 114 may return a message to device 102 intended for the called party. The message may indicate that the prescription is ready for pickup in addition to the pharmacy's name and telephone number. Also, the message may include helpful information including directions to the pharmacy, operating hours of the pharmacy, allergic reactions to the prescription, web sites for additional information about the prescription and/or the affliction the prescription is intending to solve, links to such web sites that can be accessed directly from one or more of the displays, and coupons or codes for use with the prescription and/or for other items in the pharmacy that can be used in person and/or on-line.

An example of informative and promotional information from a service provider may involve a called party who is subscribed to television cable service from a cable company. The cable company may initiate a call upon issuance of a new bill to the wireless IP-enabled device. The CNAM database 112 or other database 114 may return a message to device 102 intended for the called party. The message may indicate that a bill is ready for review in addition to the company's name and telephone number. In addition, the message may include promotional information, such as television shows that are scheduled for the evening or movies ready for order by the called party.

An example of situational information from a service provider may involve a tornado that is heading towards a called party. The emergency service provider, such as the police or fire department, may initiate a call to called party's wireless IP-enabled device 102 which may be located at the called party's residence. The CNAM database 116 or other database 118 may return an emergency message to device 102 intended for the called party. The message may indicate that a tornado is heading towards the residence in addition to the emergency service provider's name and telephone number. Also, the message may include the location and speed of the tornado based on the latest data and directions to nearby tornado shelters or other information related to the event.

Alternatively, if the ANI or other identifier of the calling party matches a calling number already exists in the wireless IP-enabled device 102, the wireless IP-enabled device 102 may determine that a lookup is not necessary. In this case, stored information associated with the calling number will be retrieved from the wireless IP-enabled device 102 and displayed to the called party via display 104.

In addition, if the information associated with the calling party, including calling name, is changed in the CNAM database 112 or other database 114, the wireless IP-enabled device 102 may send a query for updated information associated with the calling number to CNAM 112 or other database 114. Continuing with the prescription example, the wireless IP-enabled device 102 may recognize that a reorder of the prescription is necessary based on the information stored in the device. The wireless IP-enabled device 102 may send a query to CNAM database 112 or other database 114 for the updated caller's number, name, city, state, or other information such that the called party may use the updated information as well as the reminder in the message to reorder the prescription.

Another example of updated information associated with the calling number may involve the change of city and/or state of the calling number in the CNAM database 112 or other database 114. The wireless IP-enabled device 102 may send a query for the updated city and/or state associated with the calling number to CNAM database 112 or other database 114. The CNAM database 112 or other database 114 may return the updated information associated with the calling number to the wireless IP-enabled device 102.

Alternative to sending a query in response to a change of information, the wireless IP-enabled device 102 may perform a periodic update of calling information from the CNAM database 112 or other database 114. For example, the wireless IP-enabled device 102 may perform an update of calling information associated with the calling number by sending a query to the database hourly, daily, weekly, bi-weekly, monthly, yearly, or after any predetermined period of time.

Figure 2:
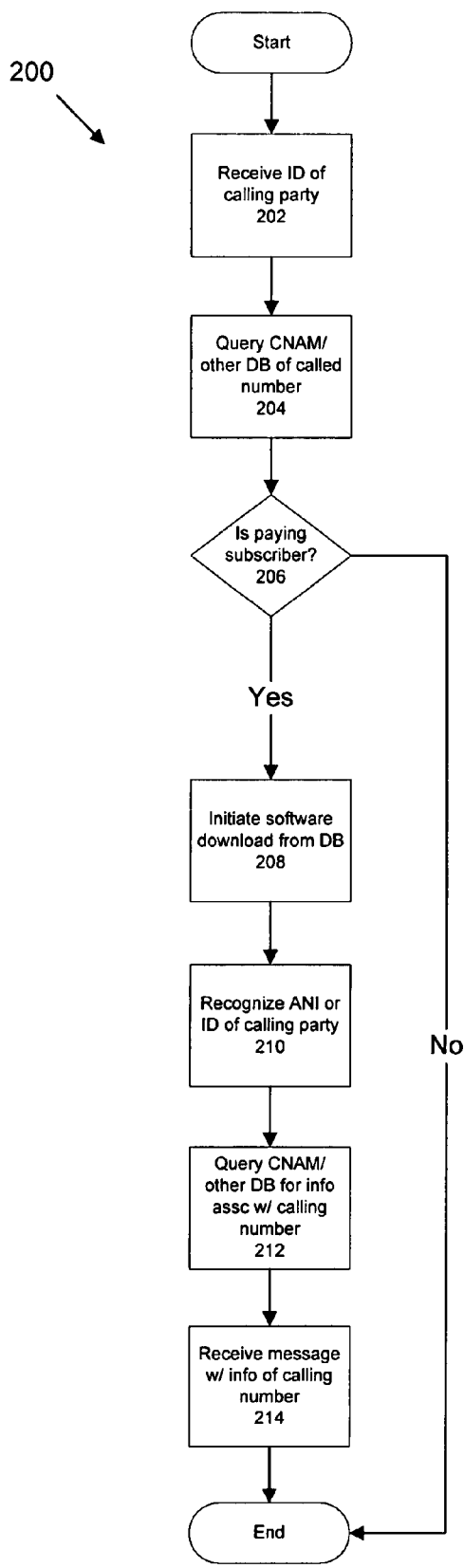
FIG. 2 depicts a flowchart of a process for IP-enabled information delivery in accordance with an embodiment of the present disclosure.

Referring to FIG. 2, a flowchart of a process (which includes a method or computer readable medium comprising instructions) for IP-enabled information delivery is depicted in accordance with one embodiment of the present disclosure. Process 200 begins at step 202 with receiving the ANI or identifier of the calling party at the wireless IP-enabled device. The identifier includes at least one of a calling party and a called party. Next, the process 200 continues to step 204 to query the CNAM database or other database of the called number via an Internet protocol connection. Process 200 then continues to step 206 to determine if the subscriber of the called number is a paying subscriber. This step may be accomplished by sending information of the called number to another database or website for verification. If the subscriber is not a paying customer, the process terminates.

If the subscriber is a paying customer, the process 200 continues to step 208 to initiate a software download either directly from a database or via the Internet. Otherwise, process 200 continues to step 210 to recognize the ANI or identifier of the calling party and delivering the ANI to the device. Process 200 then continues to step 212 to query the CNAM database or other database for information associated with the calling number via an Internet protocol connection. Examples of information include the caller's number, name, city, state, an address, a text, a video, a hyperlink, or any other information that may be sent via the Internet protocol connection. Process 200 then completes at step 214 to receive a message from the CNAM database or other database with information associated with the calling number.

Figure 3:
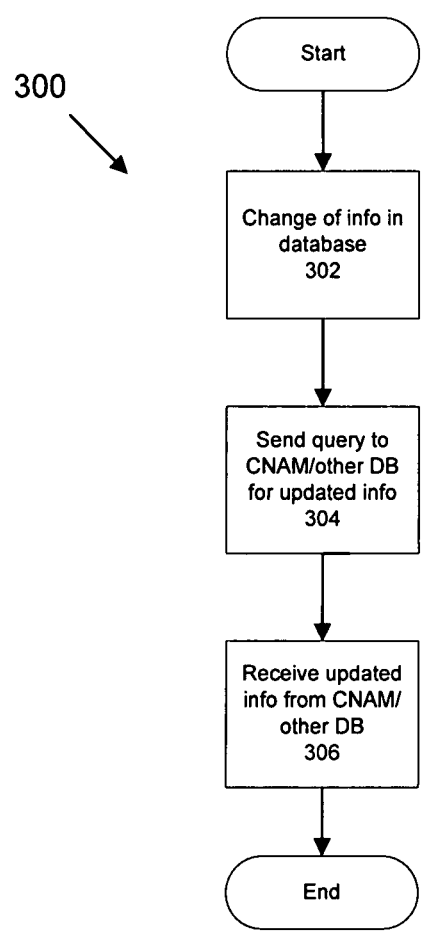
FIG. 3 depicts a flowchart of a process for updating calling information based on a change in the database in accordance with an embodiment of the present disclosure.
Figure 4:
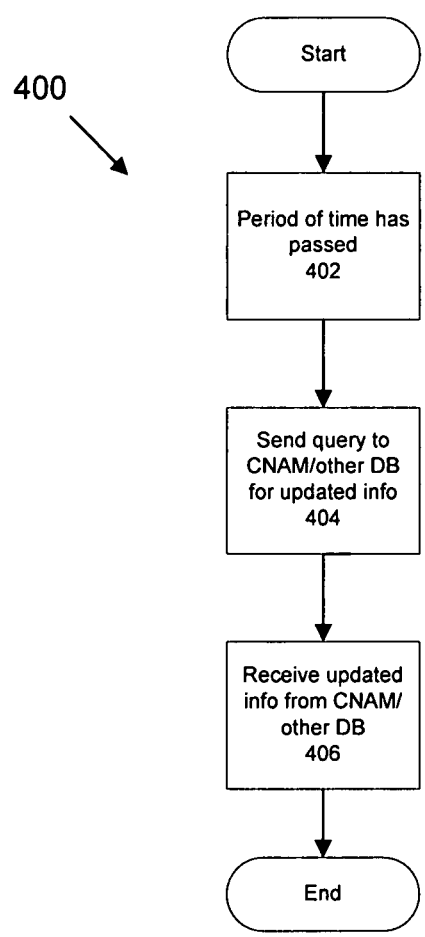
FIG. 4 depicts a flowchart of a process for periodic update of calling information in accordance with an embodiment of the present disclosure.

As discussed above, a change of information in the database may trigger the wireless IP-enabled device to update calling information. Referring to FIG. 3, a flowchart of a process for updating calling information based on a change in the database is depicted in accordance with one embodiment of the present disclosure. Process 300 begins at step 302 with changing of information in a CNAM or other database. Examples of information changed in the database include caller's name, address, city, state, and the like. Process 300 then continues to step 304 to send a query to CNAM database or other database for the updated information via an Internet protocol connection. Process 300 then completes at step 306 to receive the updated information from the CNAM database or other database.

Although an exemplary embodiment of the system, method, and computer readable medium of the present disclosure has been illustrated in the accompanied drawings and described in the foregoing detailed description, it will be understood that the invention is not limited to the embodiments disclosed, but is capable of numerous rearrangements, modifications, and substitutions without departing from the spirit and scope of the present disclosure as set forth and defined by the following claims. For example, a greater or lesser numbers of elements, modules, hardware, software, and/or firmware can be used to provide IP-enabled information delivery without departing from the spirit and scope of the present invention. Also, the wireless IP-enabled device may be a wireless mobile phone, a personal digital assistant, a cellular phone, an IP-enabled caller ID device, or a wired telephone that has IP communication capabilities.

What is claimed is:

1. A method for providing Internet protocol enabled information delivery, the method comprising:
receiving information from a calling party, at an Internet protocol enabled device, comprising an identifier of the calling party;
performing, by the Internet protocol enabled device, a lookup of information relating to the calling party in a database via an Internet protocol connection;
wherein the performing comprises:
recognizing, by the Internet protocol enabled device, the identifier of the calling party; and
sending, by the Internet protocol enabled device, a query for information relating to the calling party to the database based on the identifier via the Internet protocol connection;
receiving a message from the database, by the Internet protocol enabled device, comprising information relating to the calling party;
determining, by the Internet protocol enabled device, whether a software download is necessary for the Internet protocol enabled device to recognize the identifier information; and
downloading, by the Internet protocol enabled device, the software when the download is necessary.

2. The method of claim 1, further comprising:
receiving an identifier, by the Internet protocol enabled device, of a called party.

3. The method of claim 1, further comprising:
determining, by the Internet protocol enabled device, whether a called number is a paying subscriber by verifying with a database or a Website.

4. The method of claim 1, further comprising:
determining, by the Internet protocol enabled device, whether the identifier is located in the database; and
returning, by the Internet protocol enabled device, information relating to the calling party if the identifier is located in the database.

5. The method of claim 2, further comprising:
matching the identifier of the calling party against a plurality of identifiers stored in the Internet protocol enabled device by said device; and
retrieving information relating to the calling party by the Internet protocol enabled device when a match exists.

6. The method of claim 1, wherein the database is at least one of a calling name database and another database.

7. The method of claim 1, further comprising:
displaying, by the Internet protocol enabled device, the information relating to the calling party on a display of the Internet protocol enabled device.

8. The method of claim 1, wherein the information relating to the calling party comprises at least one of a telephone number of the calling party, a name, a city, a state, an address, a photo, a video, a text, a hyperlink, and any other information that can be sent via the Internet protocol connection.

9. A system for providing Internet protocol enabled information delivery, comprising:
at least one Internet protocol enabled device configured to receive information from a calling party comprising an identifier of the calling party;
at least one database configured to store information relating to the calling party, wherein the at least one database is communicably coupled to the at least one wireless Internet protocol enabled device; and
at least one Web database configured to store software to identify the calling party, wherein the at least one Web database communicably coupled to the at least one wireless Internet protocol enabled device via the Internet,
wherein the at least one Internet protocol enabled device is configured to receive information from the calling party, perform a lookup of information relating to the calling party in a database via an Internet Protocol connection, and receive a message from the at least one database, and the at least one Internet protocol enabled device is configured to determine whether a software download is necessary for the Internet protocol enabled device to recognize the identifier information, and to download the software from the Web database when the download is necessary;
wherein the at least one Internet protocol enabled device is further configured to recognize the identifier of the calling party, and send a query for information relating to the calling party to the database based on the identifier.

10. The system of claim 9, wherein the at least one Internet protocol enabled device is further configured to determine whether the identifier is located in the database, and return information relating to the calling party when the identifier is located in the database.

11. The system of claim 9, wherein the at least one Internet protocol enabled device is further configured to match the identifier of the calling party against a plurality of identifiers stored in the Internet protocol enabled device, and retrieve information relating to the calling party from the Internet protocol enabled device when a match exists.

12. The system of claim 9, wherein the at least one database is at least one of a calling name database and another database.

13. The system of claim 9, wherein the at least one Internet protocol enabled device is further configured to display the information relating to the calling party on a display of the Internet protocol enabled device.

14. The system of claim 9, wherein the information relating to the calling party comprises at least one of a telephone number of the calling party, a name, a city, a state, an address, a photo, a video, a text, a hyperlink, and any other information that can be sent via the Internet protocol connection.

15. A non-transitory computer readable medium comprising instructions for:

receiving information from a calling party at an Internet protocol enabled device comprising an identifier of the calling party;
 performing a lookup of information relating to the calling party in a database via an Internet protocol connection;
 recognizing the identifier of the calling party; and
 sending a query for information relating to the calling party to the database based on the identifier;
 receiving a message from the database comprising information relating to the calling party;
 determining, by the Internet protocol enabled device, whether a software download is necessary for the Internet protocol enabled device to recognize the identifier information; and
 downloading, by the Internet protocol enabled device, the software when the download is necessary.

16. The non-transitory computer readable medium of claim 15, further comprising instructions for:

determining whether the identifier is located in the database; and
 returning information relating to the calling party when the identifier is located in the database.

17. The non-transitory computer readable medium of claim 15, further comprising instructions for:

displaying the information relating to the calling party on a display of the Internet protocol enabled device.

\* \* \* \* \*